US012428299B2

(12) United States Patent
Ihara et al.

(10) Patent No.: US 12,428,299 B2
(45) Date of Patent: Sep. 30, 2025

(54) METHOD FOR SEPARATING SINGLE-WALLED CARBON NANOTUBE MIXTURE AND SINGLE-WALLED CARBON NANOTUBE DISPERSION LIQUID

(71) Applicant: NEC CORPORATION, Tokyo (JP)

(72) Inventors: Kazuki Ihara, Tokyo (JP); Hideaki Numata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/650,189

(22) PCT Filed: Sep. 29, 2017

(86) PCT No.: PCT/JP2017/035741
§ 371 (c)(1),
(2) Date: Mar. 24, 2020

(87) PCT Pub. No.: WO2019/064597
PCT Pub. Date: Apr. 4, 2019

(65) Prior Publication Data
US 2020/0223695 A1    Jul. 16, 2020

(51) Int. Cl.
*B32B 9/00*   (2006.01)
*C01B 32/159*   (2017.01)
*C01B 32/174*   (2017.01)

(52) U.S. Cl.
CPC .......... *C01B 32/159* (2017.08); *C01B 32/174* (2017.08); *C01B 2202/02* (2013.01); *C01B 2202/22* (2013.01); *C01B 2202/26* (2013.01)

(58) Field of Classification Search
CPC ....... Y10T 428/30; B82Y 30/00; B82Y 40/00; Y10S 977/742

USPC .......................................... 428/408; 423/448
See application file for complete search history.

(56) References Cited

U.S. PATENT DOCUMENTS

| 8,697,026 B2 * | 4/2014 | Tanaka ................ H01L 51/0048 |
| | | 423/447.1 |
| 2007/0001220 A1 * | 1/2007 | Tombler, Jr. ........... B82Y 10/00 |
| | | 257/330 |
| 2010/0098877 A1 * | 4/2010 | Cooper .................... B01J 20/20 |
| | | 977/890 |

(Continued)

FOREIGN PATENT DOCUMENTS

| JP | 2008-55375 A | 3/2008 |
| JP | 2012-160434 A | 8/2012 |

(Continued)

OTHER PUBLICATIONS

International Search Report for PCT/JP2017/035741 dated Oct. 31, 2017 (PCT/ISA/210).

(Continued)

*Primary Examiner* — Daniel H Miller
(74) *Attorney, Agent, or Firm* — Sughrue Mion, PLLC

(57) ABSTRACT

A method for separating a single-walled carbon nanotube mixture includes: preparing a dispersion liquid containing the single-walled carbon nanotube mixture and a surfactant; and separating the single-walled carbon nanotube mixture contained in the dispersion liquid, wherein in the separating the single-walled carbon nanotube mixture, a dispersion liquid in which a physical property of the dispersion liquid is within a prescribed range is used.

22 Claims, 8 Drawing Sheets

(56) References Cited

U.S. PATENT DOCUMENTS

| | | | | |
|---|---|---|---|---|
| 2013/0048949 A1* | 2/2013 | Xia | ............... | H01L 51/0537 257/29 |
| 2013/0222510 A1* | 8/2013 | Kim | ............... | B82Y 30/00 977/932 |
| 2015/0291429 A1* | 10/2015 | Ge | ............... | B03D 3/00 494/37 |
| 2016/0167968 A1* | 6/2016 | Tohji | ............... | H01M 4/96 564/1 |

FOREIGN PATENT DOCUMENTS

| | | |
|---|---|---|
| JP | 2013-210595 A | 10/2013 |
| JP | 2014-60158 A | 4/2014 |
| JP | 2015-13772 A | 1/2015 |
| JP | 5717233 B2 | 5/2015 |
| WO | 2008/143821 A1 | 11/2008 |
| WO | 2010/150808 A1 | 12/2010 |
| WO | 2015/190108 A1 | 12/2015 |

OTHER PUBLICATIONS

Japanese Written Opposition for JP Application No. 2019-544194 mailed on May 31, 2022.

Haruhisa Kato, "Resolution of Dispersion Stabilization Mechanism of Aqueous Dispersion of Nano-carbon Material" Report of Research Results of Grants-in-Aid for Scientific Research, Jun. 13, 2014.

Haruhisa Kato et al., "Behavior of surfactants in aqueous dispersions of single-walled carbon nanotubes" The Royal Society of Chemistry Adv., 2014, 4, p. 2129-2136.

Brian White et al., "Zeta-Potential Measurements of Surfactant-Wrapped Individual Single-Walled Carbon Nanotubes" J.Phys. Chem. C 2007, 111, p. 13684-13690.

JP Office Action for JP Application No. 2019-544194, mailed on Jul. 22, 2022 with English Translation.

* cited by examiner

METHOD FOR SEPARATING SINGLE-WALLED CARBON NANOTUBE MIXTURE AND SINGLE-WALLED CARBON NANOTUBE DISPERSION LIQUID

CROSS REFERENCE TO RELATED APPLICATIONS

This application is a National Stage of International Application No. PCT/JP2017/035741 filed Sep. 29, 2017.

TECHNICAL FIELD

The present invention relates to a method for separating a single-walled carbon nanotube mixture and a single-walled carbon nanotube dispersion liquid.

BACKGROUND ART

In recent years, it has come to be expected that carbon materials in a nanometer range, so-called nanocarbon materials, will be used as various new materials due to their mechanical properties, electrical properties, and chemical properties. One of nanocarbon materials includes carbon nanotubes. Carbon nanotubes are cylindrical substances constituted of carbon atoms. Among carbon nanotubes, carbon nanotubes in which a cylindrical layer is a single layer are particularly referred to as "single-walled carbon nanotubes."

Single-walled carbon nanotubes are nanocarbon materials having excellent electrical properties and are expected to be next-generation electronic materials. It is known that these single-walled carbon nanotubes are divided into single-walled carbon nanotubes having two different properties, i.e., a metallic property and a semiconductor property, in accordance with diameters of tubes and winding conditions. That is to say, if single-walled carbon nanotubes are synthesized using conventional manufacturing methods, single-walled carbon nanotube mixtures containing single-walled carbon nanotubes having metallic properties (hereinafter referred to as "metallic single-walled carbon nanotubes") and carbon nanotubes having semiconductor properties (hereinafter referred to as "semiconducting single-walled carbon nanotubes") in a statistical ratio of approximately 1:2 are obtained.

In the field of semiconductor devices, thin film transistors (TFTs) in which amorphous or polycrystalline silicon is used as semiconductor films are known. TFTs have been put into practical use for switching elements such as for active matrix liquid crystal displays.

In recent years, the use of single-walled carbon nanotubes has been researched as materials for semiconductor films for TFTs. Examples of such TFTs include TFTs having thin films containing single-walled carbon nanotubes. Such TFTs in which single-walled carbon nanotubes are used have advantages in which the TFTs can be manufactured at a temperature lower than that of TFTs in which amorphous or polycrystalline silicon is used. For this reason, when single-walled carbon nanotubes are used, it is possible to form circuits above plastic substrates. As a result, it is expected that it will be possible to reduce weights of semiconductor devices and/or reduce the manufacturing costs of semiconductor devices.

As described above, single-walled carbon nanotubes contain metallic single-walled carbon nanotubes and semiconducting single-walled carbon nanotubes in a ratio of approximately 1:2. Therefore, when single-walled carbon nanotube mixtures are used as electronic materials, problems such as deterioration of electrical characteristics may occur in some cases. For example, when single-walled carbon nanotubes are used as materials of semiconductor films for TFTs, metallic single-walled carbon nanotubes cause performance degradation such as short circuiting and On/Off performance degradation.

In order to solve such problems of performance degradation, so far a method for separating metallic single-walled carbon nanotubes and semiconducting single-walled carbon nanotubes has been proposed for the purpose of bringing a separation efficiency as close to 100% as possible. Examples of the separation method include a method for forming single-walled carbon nanotube dispersion liquid layers having two or more groups of different properties by dispersing single-walled carbon nanotubes in a solution containing a non-ionic surfactant and applying a direct current (DC) voltage in this dispersion liquid in a vertical direction (for example, refer to Patent Document 1). According to this method, when TFTs are prepared, it is possible to obtain an excellent semiconducting single-walled carbon nanotube dispersion liquid which does not contain ionic species such as sodium which are likely to deteriorate properties thereof.

PRIOR ART DOCUMENTS

Patent Documents

[Patent Document 1] Japanese Patent No. 5717233

SUMMARY OF THE INVENTION

Problem to be Solved by the Invention

However, when a single-walled carbon nanotube mixture is separated using the separation method of Patent Document 1, single-walled carbon nanotubes which are not easily separated into either metallic single-walled carbon nanotubes or semiconducting single-walled carbon nanotubes are present.

An object of the present invention is to provide a method for separating a single-walled carbon nanotube mixture and a single-walled carbon nanotube dispersion liquid in which the single-walled carbon nanotube mixture is easily separated.

Means for Solving the Problem

A method for separating a single-walled carbon nanotube mixture of the present invention is a method for separating a single-walled carbon nanotube mixture which includes: a step of preparing a dispersion liquid containing the single-walled carbon nanotube mixture and a surfactant; and a step of separating the single-walled carbon nanotube mixture contained in the dispersion liquid. In addition, in the step of separating the single-walled carbon nanotube mixture, a dispersion liquid in which a physical property quantity of the dispersion liquid is within a prescribed range is used.

A single-walled carbon nanotube dispersion liquid of the present invention contains a single-walled carbon nanotube mixture and a surfactant and has an average zeta potential of −15 mV or higher and 0 mV or lower.

Effect of the Invention

According to the present invention, it is possible to provide a method for separating a single-walled carbon nanotube mixture and a single-walled carbon nanotube dispersion liquid in which the single-walled carbon nanotube mixture is easily separated.

EMBODIMENTS FOR CARRYING OUT THE INVENTION

Example embodiments of a method for separating a single-walled carbon nanotube mixture and a single-walled carbon nanotube dispersion liquid of the present invention will be described.

These example embodiments are specifically described to make the gist of the invention better understood and are not intended to limit the present invention unless otherwise stated.

Method for Separating Single-Walled Carbon Nanotube Mixture

Materials used as single-walled carbon nanotube materials may be subjected to an acid treatment for the purpose of removing catalytic metals or the like. For this reason, some single-walled carbon nanotube materials having surfaces or the like modified with many functional groups such as carboxyl groups and carbonyl groups are present among single-walled carbon nanotube materials. Such single-walled carbon nanotube materials have different charges in a solution compared to when the single-walled carbon nanotube materials are not modified due to the influence of the modified functional group. As a result, the modified single-walled carbon nanotube materials have surface electrical states different from the original properties of the single-walled carbon nanotubes. Therefore, the modified single-walled carbon nanotube materials are not easily separated into metallic single-walled carbon nanotubes and semiconducting single-walled carbon nanotubes.

As a result of examining the above-mentioned problems repeatedly, it has been found in the present invention or the like that, in a single-walled carbon nanotube dispersion liquid in which physical property quantities thereof such as a zeta potential are adjusted to within a prescribed range, a high purity metallic single-walled carbon nanotube dispersion liquid and semiconducting single-walled carbon nanotube dispersion liquid are obtained by applying a direct current (DC) voltage in a vertical direction in the single-walled carbon nanotube dispersion liquid and forming single-walled carbon nanotube dispersion liquid layers having two or more groups of different properties.

A method for separating a single-walled carbon nanotube mixture in this example embodiment will be described in detail below.

Figure 1:
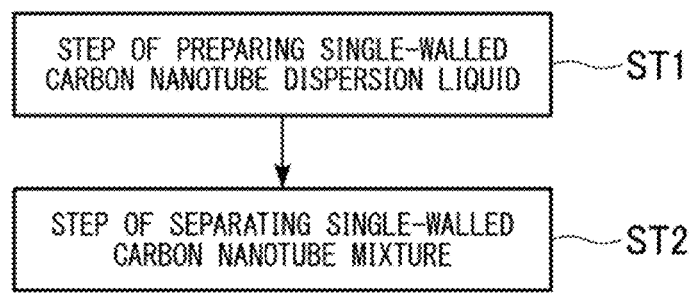
FIG. 1 is a flowchart showing a method for separating a single-walled carbon nanotube mixture of the present invention.

FIG. 1 is a flowchart showing the method for separating a single-walled carbon nanotube mixture in this example embodiment.

The method for separating a single-walled carbon nanotube mixture in this example embodiment is a method for separating a single-walled carbon nanotube mixture including a step of having a cleaning treatment of the single-walled carbon nanotube mixture and preparing a dispersion liquid containing the single-walled carbon nanotube mixture and a surfactant (hereinafter referred to as "Step A") and a step of separating the single-walled carbon nanotube mixture contained in the dispersion liquid (hereinafter referred to as "Step B"). Furthermore, Step A has an operation for adjusting physical property quantities of the dispersion liquid to within a prescribed range.

In the method for separating a single-walled carbon nanotube mixture in this example embodiment, first, a single-walled carbon nanotube mixture is prepared.

The single-walled carbon nanotubes in the method for separating a single-walled carbon nanotube mixture in this example embodiment may be single-walled carbon nanotubes composed of pure carbon and single-walled carbon nanotubes obtained by substituting the single-walled carbon nanotubes with any appropriate functional group to develop solubility in an aqueous solvent. Furthermore, the single-walled carbon nanotubes in the method for separating a single-walled carbon nanotube mixture in this example embodiment are tubular carbon materials having a single wall.

The single-walled carbon nanotube mixture is not particularly limited as long as the single-walled carbon nanotube mixture contains metallic single-walled carbon nanotubes and semiconducting single-walled carbon nanotubes. That is to say, the single-walled carbon nanotube mixture may be synthesized using a well-known method for synthesizing a single-walled carbon nanotube and a commercially available single-walled carbon nanotube mixture.

In Step A, before the single-walled carbon nanotube mixture is dispersed in a solution containing the surfactant and a dispersion medium, the single-walled carbon nanotube mixture is subjected to a cleaning treatment. The cleaning treatment is performed to remove unnecessary charges generated due to the functional group added to surfaces of the single-walled carbon nanotubes.

A cleaning treatment method is not particularly limited as long as the cleaning treatment method can remove functional groups present on the surfaces of the single-walled carbon nanotubes. Examples of the cleaning treatment method include an annealing method of heating a single-walled carbon nanotube mixture in a vacuum, under an inert atmosphere such as nitrogen gas or argon gas, or under a reducing atmosphere using hydrogen or the like, a hydrazine treatment method, a reflux method, an autoclave method, and the like. Among these methods, a vacuum annealing method for heating a single-walled carbon nanotube mixture to 500° C. or higher in a vacuum and maintaining the single-walled carbon nanotube mixture at this temperature for a prescribed time is particularly desirable.

Subsequently, a dispersion liquid containing the single-walled carbon nanotube mixture and the surfactant (hereinafter referred to as a "single-walled carbon nanotube dispersion liquid") is prepared by dispersing the single-walled carbon nanotube mixture which has been subjected to the cleaning treatment in the solution containing the surfactant and the dispersion medium.

In Step A, physical property quantities of the single-walled carbon nanotube dispersion liquid are adjusted within a prescribed range by dispersing the single-walled carbon nanotube mixture which has been subjected to the cleaning treatment in the solution containing the surfactant and the dispersion medium. In the method for separating a single-walled carbon nanotube mixture in this example embodiment, the physical property quantities of the single-walled carbon nanotube dispersion liquid include an average zeta potential of the single-walled carbon nanotube dispersion liquid, a pH of the single-walled carbon nanotube dispersion liquid, or a conductivity of the single-walled carbon nanotube dispersion liquid.

The dispersion medium is not particularly limited as long as the dispersion medium can disperse a single-walled carbon nanotube mixture. Examples of the dispersion medium include water, heavy water, organic solvents, ionic liquid, and the like. Among these dispersion media, it is desirable that water or heavy water be used because in that case single-walled carbon nanotubes do not deteriorate.

Examples of the surfactant include non-ionic surfactants, cationic surfactants, anionic surfactant, and the like. In order to prevent ionic impurities such as sodium ions from entering single-walled carbon nanotubes, it is desirable to utilize non-ionic surfactants.

As the non-ionic surfactants, non-ionic surfactants having a polyethylene glycol structure represented by a polyoxyethylene alkyl ether type and non-ionic surfactants composed of a hydrophilic site such as alkyl glucoside type non-ionic surfactants in which ionization does not occur and a hydrophobic site such as an alkyl chain can be used alone or used in a combination of two or more non-ionic surfactants. As such non-ionic surfactants, it is desirable that a polyoxyethylene alkyl ether represented by the following Expression (1) be used:

$$C_nH_{2n}(OCH_2CH_2)_mOH \qquad (1)$$

(where, n=12 to 18 and m=20 to 100).

Examples of the polyoxyethylene alkyl ether represented by the foregoing Expression (1) include polyoxyethylene (23) lauryl ether (trade name: Brij L23; manufactured by Sigma-Aldrich), polyoxyethylene (20) cetyl ether (trade name: Brij C20; manufactured by Sigma-Aldrich), polyoxyethylene (20) stearyl ether (trade name: Brij S20; manufactured by Sigma-Aldrich), polyoxyethylene (20) oleyl ether (trade name: Brij O20; manufactured by Sigma-Aldrich), polyoxyethylene (100) stearyl ether (trade name: Brij S100; manufactured by Sigma-Aldrich), and the like.

A method for preparing a single-walled carbon nanotube dispersion liquid is not particularly limited and a well-known method may be used as the method. For example, a method for subjecting a mixed liquid of a dispersion medium containing a single-walled carbon nanotube mixture and a surfactant to ultrasonic treatment to disperse the single-walled carbon nanotube mixture in the dispersion medium may be exemplified. A method for dispersing the single-walled carbon nanotube mixture in the dispersion medium using a mechanical shearing force instead of ultrasonic treatment may be used. In the single-walled carbon nanotube dispersion liquid, it is desirable that metallic single-walled carbon nanotubes and semiconducting single-walled carbon nanotubes contained in a single-walled carbon nanotube mixture be dispersed independently without aggregation. For this reason, it is desirable that metallic single-walled carbon nanotubes and semiconducting single-walled carbon nanotubes which have not been dispersed through ultrasonic treatment or the like be separated or removed through ultracentrifugation.

The amount of the surfactant in the single-walled carbon nanotube dispersion liquid is not particularly limited as long as the amount of the surfactant is within a range in which the surfactant can disperse the single-walled carbon nanotube mixture in the dispersion medium. The amount of the surfactant in the single-walled carbon nanotube dispersion liquid is, for example, a critical micelle concentration or more and 10 wt % or less.

Although the amount of the single-walled carbon nanotube mixture in the single-walled carbon nanotube dispersion liquid may be any concentration as long as the single-walled carbon nanotube mixture is dispersed and suspended inside the dispersion liquid for a corresponding processing time, the amount is preferably 0.001 µg/mL or more and 1 g/mL or less, and more preferably 0.1 µg/mL or more and 100 mg/mL or less.

If the amount of the single-walled carbon nanotube mixture in the single-walled carbon nanotube dispersion liquid is in the above-described range, single-walled carbon nanotubes contained in the single-walled carbon nanotube mixture and having two or more groups of different properties can be separated into single-walled carbon nanotubes for each different property.

If an average zeta potential, a pH, or a conductivity is evaluated, this value of the single-walled carbon nanotube dispersion liquid prepared in this way is within a prescribed range.

When the physical property quantities of the single-walled carbon nanotube dispersion liquid are evaluated, as the single-walled carbon nanotube dispersion liquid, the single-walled carbon nanotube dispersion liquid prepared as described above may be directly used, single-walled carbon nanotube dispersion liquids obtained by diluting the single-walled carbon nanotube dispersion liquid using water so that the amount of the non-ionic surfactant in the single-walled carbon nanotube dispersion liquid is changed to the critical micelle concentration may be directly used, and single-walled carbon nanotube dispersion liquids obtained by removing the non-ionic surfactant contained in the single-walled carbon nanotube dispersion liquid to reduce the amount of the non-ionic surfactant using a cross-flow filtration method or the like which is a dialysis method or a dynamic dialysis method may be used. Among these, it is particularly desirable to utilize single-walled carbon nanotube dispersion liquids obtained by reducing the amount of the non-ionic surfactant to the vicinity of the critical micelle concentration by removing the non-ionic surfactant contained in the single-walled carbon nanotube dispersion liquid.

It is possible to derive an average zeta potential of the single-walled carbon nanotube dispersion liquid from dynamic or static electrical mobility. Generally, it is possible to utilize a method called a laser Doppler method. The laser Doppler method is a method for obtaining a velocity at which particles move from a frequency shift (a Doppler shift) using beam scattering through laser beam in a solution to which an alternating current (AC) electric field has been applied. Since an amount of the Doppler shift is proportional to the velocity at which particles move, it is possible to obtain a migration velocity of particles. It is possible to easily obtain an electrical mobility ($U=V/E$) from this migration velocity (V) and an applied electric field intensity (E). As a result, the electrical mobility of the particles in the solution is determined. It is possible to obtain the electrical mobility using, for example, the Smoluchowski Expression (zeta potential (Z)=4×π×viscosity of solvent (η)×electrical mobility (U)/dielectric constant of solvent (ε)).

Examples of such an electrical mobility measuring device include ELSZ-2Plus manufactured by OTSUKA ELECTRONICS Co., LTD, and the like.

It is possible to determine a preferable range of the average zeta potential in the single-walled carbon nanotube dispersion liquid by preparing a single-walled carbon nanotube dispersion solution from which a functional group has been removed as a standard sample and obtaining a zeta potential thereof. For example, when polyoxyethylene (100) stearyl ether is used as a surfactant, a mono-dispersed solution is prepared by injecting 1 mg of single-walled carbon nanotubes in which a functional group is not contained into a 1 wt % surfactant solution and subjecting the mixture to ultrasonic dispersion and ultracentrifugation. It is possible to obtain a range of the average zeta potential by evaluating the mono-dispersed solution in detail using a zeta potential measuring device.

In the method for separating a single-walled carbon nanotube mixture in this example embodiment, the average zeta potential of the single-walled carbon nanotube dispersion liquid is adjusted to preferably −15 mV or higher, and more preferably −13 mV or higher.

If the average zeta potential of the single-walled carbon nanotube dispersion liquid is −15 mV or higher, it is possible to separate the single-walled carbon nanotubes having two or more groups of different properties contained in the single-walled carbon nanotube dispersion liquid into single-walled carbon nanotubes for each property.

In the method for separating a single-walled carbon nanotube mixture in this example embodiment, the average zeta potential of the single-walled carbon nanotube dispersion liquid is adjusted to preferably 0 mV or lower, and more preferably −7 mV or lower.

If the average zeta potential of the single-walled carbon nanotube dispersion liquid is 0 mV or lower, it is possible to separate the single-walled carbon nanotubes having two or more groups of different properties contained in the single-walled carbon nanotube dispersion liquid into single-walled carbon nanotubes for each property.

A method for evaluating (measuring) a pH of the single-walled carbon nanotube dispersion liquid may be any methods as long as the method can measure a pH of the solution. Examples of the pH measuring method include a neutralization titration method, an indicator method, a metal electrode method, a glass electrode method, a semiconductor sensor method, and the like. Particularly, as the pH measuring method, measurement using a neutralization titration method, a semiconductor sensor method, and a glass electrode method is simple and appropriate.

It is possible to statistically obtain a preferable range of the pH of the single-walled carbon nanotube dispersion liquid by adjusting a single-walled carbon nanotube dispersion solution from which a functional group has been removed as a standard sample and obtaining the pH thereof. For example, when polyoxyethylene (100) stearyl ether is used as a surfactant, a mono-dispersed solution is prepared by injecting 1 mg of the single-walled carbon nanotubes in which a functional group is not contained into a 1 wt % surfactant solution and subjecting the mixture to ultrasonic dispersion and ultracentrifugation. It is possible to obtain the range of the pH by evaluating the pH of the mono-dispersed solution exactly. Generally, since a carbon surface in which a functional group is not present is hydrophobic and the effect of a carboxyl group of the surface is eliminated, a mono-dispersed solution in which a pH shift is small is obtained. Therefore, the pH of the single-walled carbon nanotube dispersion liquid is mainly the same as a pH of a dispersant (a surfactant). When polyoxyethylene (100) stearyl ether is used as an example, it is desirable that the pH range be a pH range which is the same as that of the dispersion solution (depending on a concentration in the range of 6.0 to 7.5).

In the method for separating a single-walled carbon nanotube mixture in this example embodiment, the pH of the single-walled carbon nanotube dispersion liquid is adjusted to preferably 6.0 or higher and 7.5 or lower, and more preferably 6.5 or higher and 7.2 or lower.

If the pH of the single-walled carbon nanotube dispersion liquid is within the above-described range, it is possible to separate the single-walled carbon nanotubes having two or more groups of different properties contained in the single-walled carbon nanotube dispersion liquid into single-walled carbon nanotubes for each property.

Examples of a method for evaluating (measuring) a conductivity of the single-walled carbon nanotube dispersion liquid include an AC two-electrode method, an electromagnetic induction method, and the like.

A preferable range of the conductivity of the single-walled carbon nanotube dispersion liquid is determined using a standard sample.

When the physical property quantities of the single-walled carbon nanotube dispersion liquid are evaluated in this way and the obtained physical property quantities are within a prescribed range, the single-walled carbon nanotubes having two or more groups of different properties contained in the single-walled carbon nanotube dispersion liquid are separated into the single-walled carbon nanotubes for each property by subjecting the single-walled carbon nanotube dispersion liquid to a separation treatment. The single-walled carbon nanotubes obtained through the separation treatment have few impurities and high purity.

Subsequently, in Step B, the single-walled carbon nanotube dispersion liquid prepared in Step A is injected into, for example, a separation tank in a carbon nanotube separation apparatus, a DC voltage is applied to a first electrode provided at an upper portion inside the separation tank and a second electrode provided at a lower portion inside the separation tank, and metallic single-walled carbon nanotubes and semiconducting single-walled carbon nanotubes contained in the single-walled carbon nanotube dispersion liquid inside the separation tank are separated.

If a DC voltage is applied to the first electrode and the second electrode for a prescribed time (for example, 1 hour to 24 hours), the single-walled carbon nanotube mixture contained in the single-walled carbon nanotube dispersion liquid is separated into metallic single-walled carbon nanotubes and semiconducting single-walled carbon nanotubes.

In the single-walled carbon nanotube dispersion liquid containing the non-ionic surfactant, the metallic single-walled carbon nanotubes have a positive charge and the semiconducting single-walled carbon nanotubes have a very weak negative charge.

Therefore, if a DC voltage is applied to the first electrode and the second electrode, the metallic single-walled carbon nanotubes of the single-walled carbon nanotube mixture contained in the single-walled carbon nanotube dispersion liquid move toward the first electrode (a cathode) side and the semiconducting single-walled carbon nanotubes thereof move toward the second electrode (an anode) side. As a result, the single-walled carbon nanotube dispersion liquid is phase-separated into three phases, i.e., a dispersion liquid phase having a relatively high amount of metallic single-walled carbon nanotubes (hereinafter referred to as a "dispersion liquid phase A"), a dispersion liquid phase having a relatively high amount of semiconducting single-walled carbon nanotubes (hereinafter referred to as a "dispersion liquid phase B"), and a dispersion liquid phase formed between the dispersion liquid phase A and the dispersion liquid phase B and having a relative low amount of metallic single-walled carbon nanotubes and semiconducting single-walled carbon nanotubes (hereinafter referred to as a "dispersion liquid phase C").

The DC voltage applied to the first electrode and the second electrode is not particularly limited and is appropriately adjusted in accordance with a distance between the first electrode and the second electrode, the amount of the single-walled carbon nanotube mixture in the single-walled carbon nanotube dispersion liquid, and the like.

When water or heavy water is used as the dispersion medium of the single-walled carbon nanotube dispersion liquid, a DC voltage applied to the first electrode and the second electrode is an arbitrary value greater than 0 V and 1000 V or less.

Also, when a DC voltage is applied to the first electrode and the second electrode, an electric field between the first electrode and the second electrode is preferably 0.5 V/cm or more and 15 V/cm or less, and more preferably 1 V/cm or more and 10 V/cm or less.

Subsequently, the dispersion liquid phase A and the dispersion liquid phase B which have been separated are collected (fractioned).

A collection method may be, but not particularly limited to, any method as long as the recovery method is a method in which the dispersion liquid phase A and the dispersion liquid phase B are not diffusively mixed.

Examples of the collection method include a method for stopping application of a DC voltage to the first electrode and the second electrode and gently suctioning out a small amount of each phase using a pipette.

A separation efficiency of the collected dispersion liquid can be evaluated using a method such as micro-Raman spectroscopy (a change in Raman spectrum in a radial breathing mode (RBM) range; a change in Raman spectrum shape in Breit-Wigner-Fano (BWF) range and ultraviolet (UV)-visible near-infrared absorption spectrophotometry (a change in peak shape of an absorption spectrum). Furthermore, it is also possible to evaluate the separation efficiency of the dispersion liquid by evaluating electrical properties of the single-walled carbon nanotubes. For example, it is possible to evaluate the separation efficiency of the dispersion liquid by preparing a field effect transistor and measuring transistor characteristics thereof.

According to the method for separating a single-walled carbon nanotube mixture in this example embodiment, in the step of preparing the single-walled carbon nanotube dispersion liquid, the single-walled carbon nanotube mixture is subjected to the cleaning treatment, the physical property quantities of the single-walled carbon nanotube dispersion liquid are adjusted within a prescribed range using the single-walled carbon nanotube mixture which has been subjected to the cleaning treatment, and the single-walled carbon nanotube mixture contained in the dispersion liquid is separated. Thus, it is possible to separate the single-walled carbon nanotube mixture having two or more groups of different properties into single-walled carbon nanotubes for each property.

Single-Walled Carbon Nanotube Dispersion Liquid

The single-walled carbon nanotube dispersion liquid in this example embodiment contains the single-walled carbon nanotube mixture and the surfactant and has the average zeta potential of −15 mV or higher and 0 mV or lower.

The single-walled carbon nanotube dispersion liquid in this example embodiment is prepared in the step of preparing a dispersion liquid in the method for separating a single-walled carbon nanotube mixture in this example embodiment.

As described above, the single-walled carbon nanotube dispersion liquid in this example embodiment is obtained by adjusting the physical property quantities thereof within a prescribed range. The physical property quantities of the single-walled carbon nanotube dispersion liquid in this example embodiment are the average zeta potential of the single-walled carbon nanotube dispersion liquid, the pH of the single-walled carbon nanotube dispersion liquid, or the conductivity of the single-walled carbon nanotube dispersion liquid.

According to the single-walled carbon nanotube dispersion liquid in this example embodiment, the single-walled carbon nanotube dispersion liquid is prepared in the step of preparing a dispersion liquid in the method for separating a single-walled carbon nanotube mixture in this example embodiment. Thus, it is possible to separate the single-walled carbon nanotube mixture having two or more groups of different properties into single-walled carbon nanotubes for each property.

WORKING EXAMPLES

Although the present invention will be described in more detail below using working examples, the present invention is not limited the following working examples.

Working Example 1

Operation of Preparing Dispersion Liquid of Single-Walled Carbon Nanotube Mixture A single-walled carbon nanotube mixture having an average diameter of 1 nm was heated in vacuum 800° C. for two hours.

Solution A obtained by dissolving 1.0 wt % of polyoxyethylene (100) stearyl ether (trade name: Brij S100; manufactured by Sigma-Aldrich) which was a non-ionic surfactant in water was prepared.

The single-walled carbon nanotube mixture was weighted so that the amount of the single-walled carbon nanotube mixture in a dispersion liquid was 0.3 μg/mL.

Subsequently, the single-walled carbon nanotube mixture was put into the solution A.

The solution A put into the single-walled carbon nanotube mixture was subjected to ultrasonic dispersion treatment at an output of 25 W for 120 minutes using a horn type ultrasonic crusher (trade name: Digital Sonifier 450; manufactured by Branson Ultrasonics). After that, an ultracentrifugation operation was performed at 250000×g and 10° C. for 50 minutes using an ultracentrifuge (trade name: CS100GX; manufactured by Hitachi koki). Furthermore, a supernatant corresponding to 80% of the single-walled carbon nanotube mixture was obtained as the dispersion liquid in the single-walled carbon nanotube mixture.

In a part of the obtained dispersion liquid in the single-walled carbon nanotube mixture, the amount of the non-ionic surfactant was reduced to 1/10 by removing the non-ionic surfactant contained in the dispersion liquid in the single-walled carbon nanotube mixture using, for example, a dialysis method.

"Evaluation of Average Zeta Potential of Dispersion Liquid in Single-Walled Carbon Nanotube Mixture"

An average zeta potential of the dispersion liquid in the single-walled carbon nanotube mixture obtained by reducing the amount of the non-ionic surfactant to 1/10 was measured.

Figure 2:
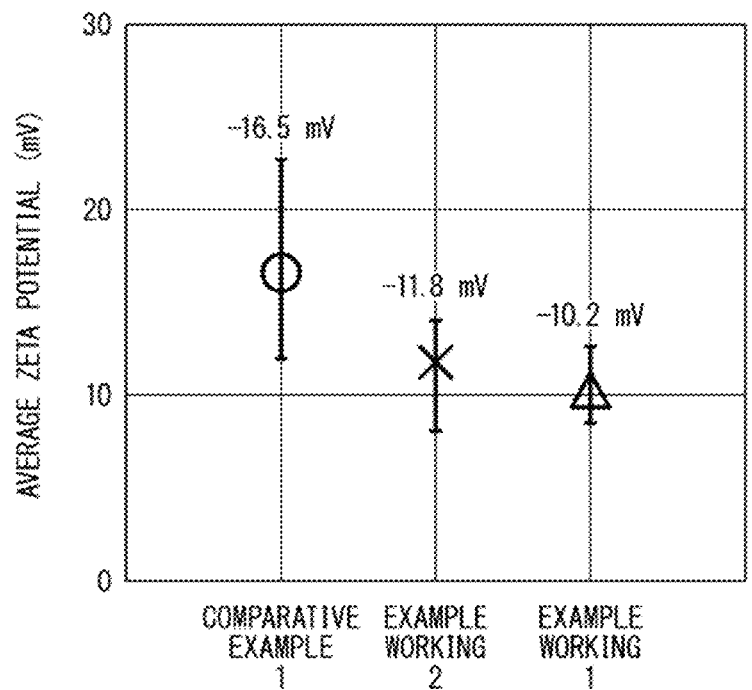
FIG. 2 is a diagram showing average zeta potentials in Working Example 1, Working Example 2, and Comparative Example 1.

Measurement was performed using a zeta potential measuring device (trade name: ELSZ-2Plus; manufactured by OTSUKA ELECTRONICS Co., LTD). FIG. 2 shows the results.

As a result of the measurement, it was confirmed that the average zeta potential of the dispersion liquid in the single-walled carbon nanotube mixture was around −10.2 mV.

"Operation of Separating Dispersion Liquid in Single-Walled Carbon Nanotube Mixture"

First, a single-walled carbon nanotube dispersion liquid (a Pristine dispersion liquid) was prepared by diluting 35 mL of a dispersion liquid in a single-walled carbon nanotube mixture using 35 mL of an aqueous 1 wt % polyoxyethylene (100) stearyl ether solution so that a total amount was 70 mL.

Subsequently, 7 mL of water, 70 mL of a dispersion liquid in the single-walled carbon nanotube mixture, and 15 mL of an aqueous 2 wt % polyoxyethylene (100) stearyl ether solution were sequentially and gently injected through an inlet port provided in the separation tank at a lower portion thereof. As a result, a layered structure of water, the dispersion liquid in the single-walled carbon nanotube mixture, and the aqueous 2 wt % polyoxyethylene (100) stearyl ether solution was formed inside the separation tank from above.

Also, a cathode made of platinum was disposed at an upper end of a layer including water and an anode made of platinum was disposed at a lower end of a layer including the aqueous 2 wt % polyoxyethylene (100) stearyl ether solution so that a distance between the electrodes was about 20 cm.

Subsequently, a voltage of 200 V was continuously applied between the cathode and the anode for 72 hours.

Figure 3:
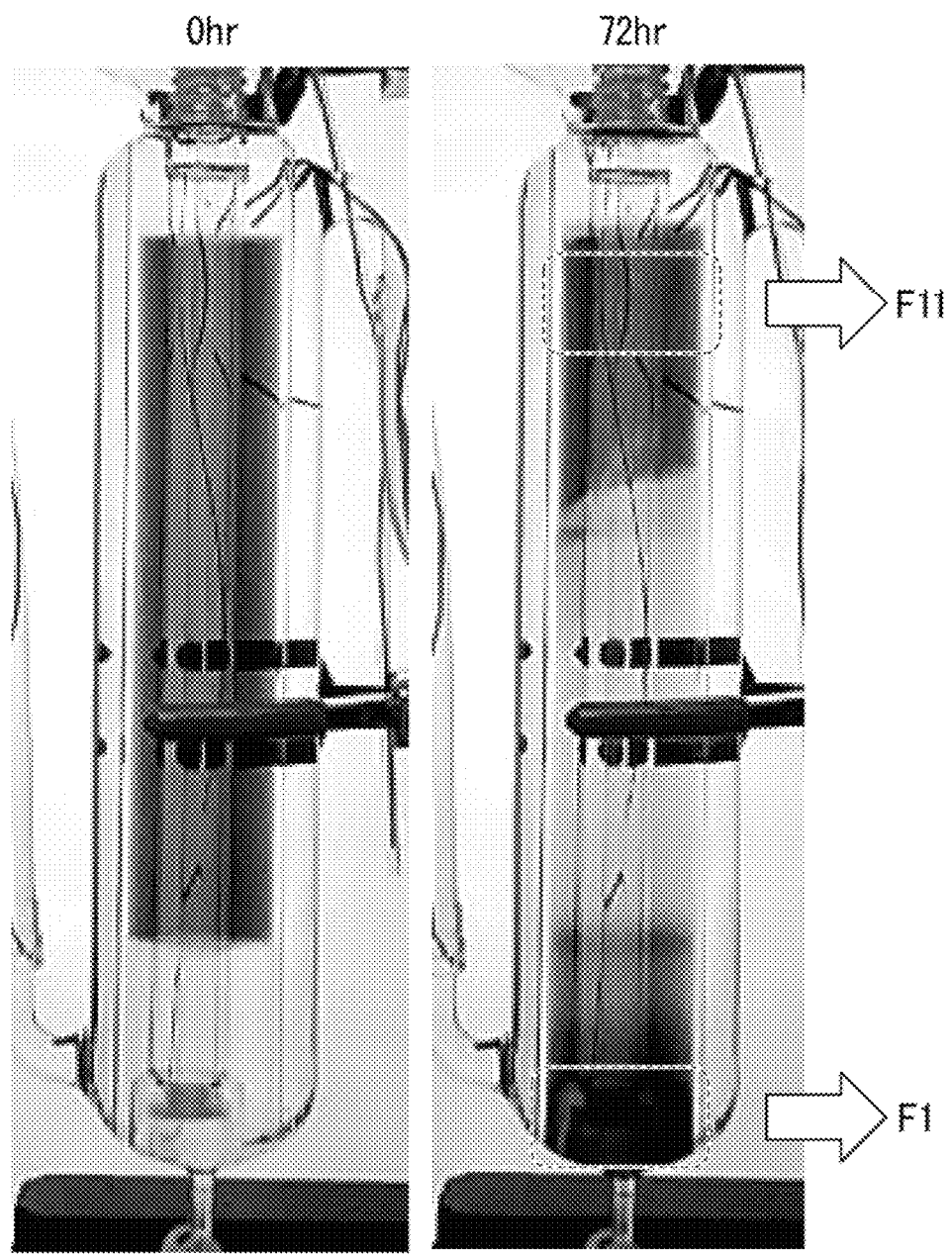
FIG. 3 is a photograph showing a layer formation state when separation ends in Working Example 1.

FIG. 3 is optical photographs showing states of a single-walled carbon nanotube dispersion liquid inside the separation tank before voltage application (0 hrs) and 72 hours after voltage application (72 hrs). If the photograph before voltage application was compared with the photograph corresponding to 72 hours after voltage application, it was found that the solution inside the separation tank was separated into three layers after 72 hours.

"Spectroscopic Analysis of Dispersion Liquid in Single-Walled Carbon Nanotube Mixture"

Figure 4:
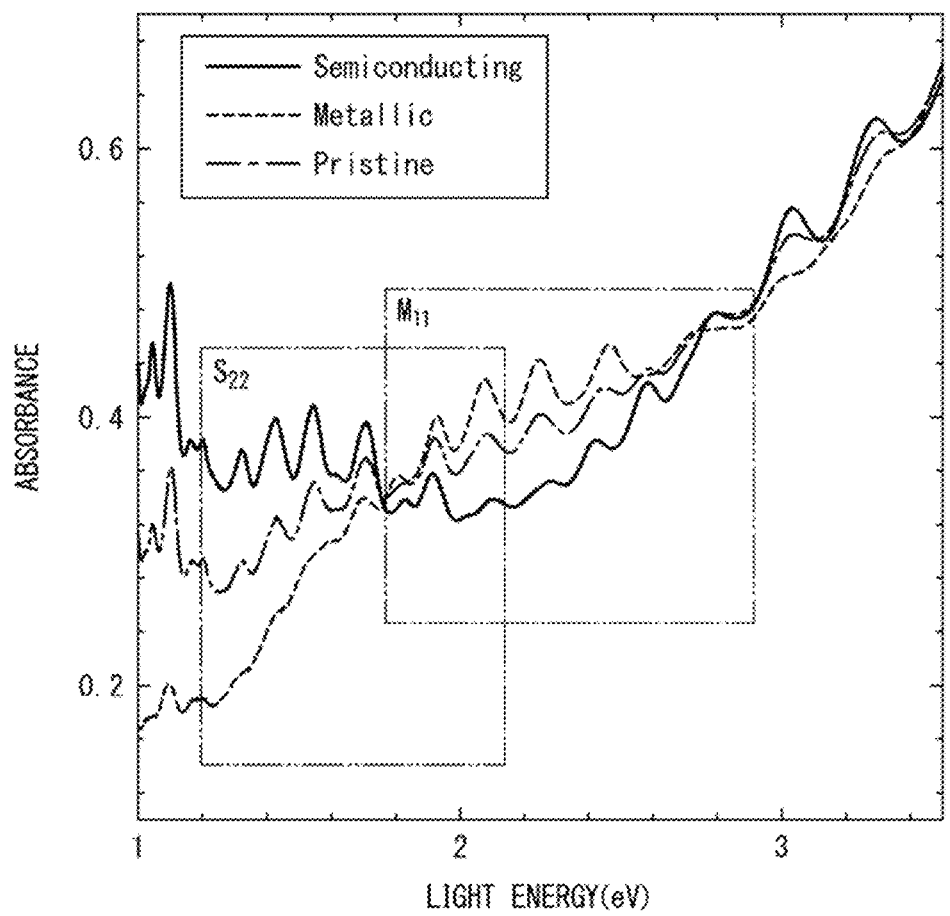
FIG. 4 is a diagram showing the results of optical absorption analysis in Working Example 1.
Figure 5:
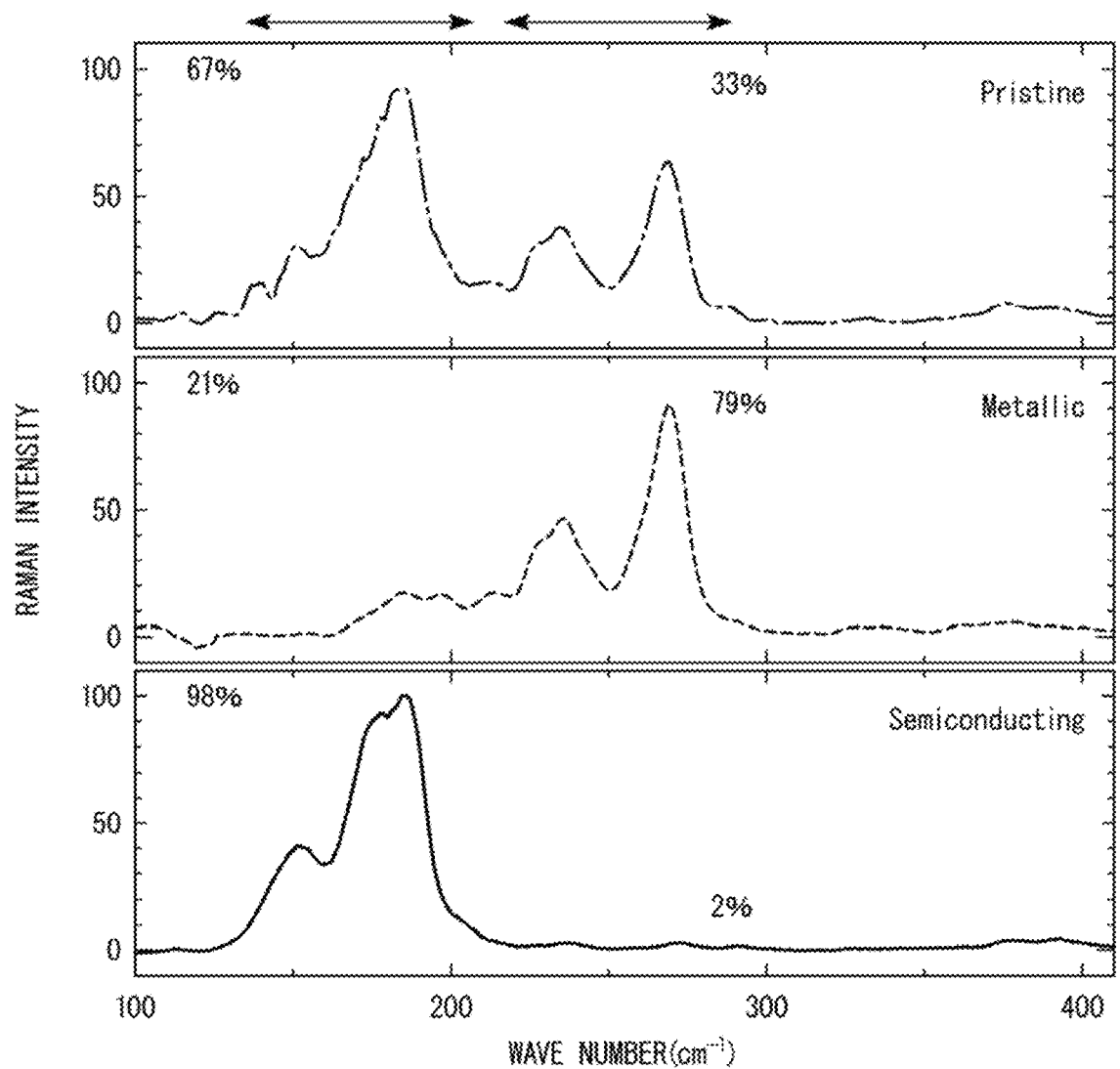
FIG. 5 is a diagram showing the results of Raman spectroscopic analysis in Working Example 1.

Each about 7 mL of the single-walled carbon nanotube dispersion liquid after 72 hours was fractionated and the single-walled carbon nanotube dispersion liquid after an operation of performing separation from an F1 layer in the lowermost portion to an eleventh F11 layer from the bottom thereof was collected. Optical absorption spectra of the single-walled carbon nanotube dispersion liquid after each separation operation and the Pristine dispersion liquid before the separation operation were measured using a spectrophotometer (trade name: UV-visible near-infrared spectrophotometer UV-3600; manufactured by Shimadzu Corporation). FIG. 4 shows the results. Furthermore, Raman spectroscopic analysis was performed. FIG. 5 shows the results.

It is confirmed from the results of the optical absorption analysis shown in FIG. 4 that, in a peak range derived from a metal (within a rectangular range of M11), compared with the Pristine dispersion liquid before the separation operation, a decrease in absorbance is observed in the (semiconducting) single-walled carbon nanotube dispersion liquid in the F1 layer after the separation and an increase in absorbance was clearly shown in the (metallic) single-walled carbon nanotube dispersion liquid in the F11 layer after the separation.

FIG. 5 is a diagram showing the results of Raman spectroscopic analysis through excitation of a laser with a wavelength of 532 nm and a spectrum in a range of a wave number of 100 cm$^{-1}$ to 400 cm$^{-1}$ called a radial breathing mode (RBM). In the spectrum shown in FIG. 5, a peak in a range of a wave number of 150 cm$^{-1}$ to 200 cm$^{-1}$ is derived from semiconducting single-walled carbon nanotubes and a peak in a range of a wave number of 200 cm$^{-1}$ to 300 cm$^{-1}$ is derived from metallic single-walled carbon nanotubes.

From the results of the Raman spectroscopic analysis shown in FIG. 5, assuming that a content ratio of semiconducting single-walled carbon nanotubes of a Pristine dispersion liquid in the single-walled carbon nanotube mixture before the separation operation was 67%, when a content ratio of semiconducting single-walled carbon nanotubes and metallic single-walled carbon nanotubes in the single-walled carbon nanotube dispersion liquid after the separation was obtained, it was found that 98% or more of semiconducting single-walled carbon nanotubes were contained in the (semiconducting) single-walled carbon nanotube dispersion liquid in the F1 layer after the separation and 79% of metallic single-walled carbon nanotubes were contained in the (metallic) single-walled carbon nanotube dispersion liquid in the F11 layer after the separation.

Comparative Example 1

"Operation of Preparing Dispersion Liquid of Single-Walled Carbon Nanotube Mixture"

Solution B obtained by dissolving 1.0 wt % of polyoxyethylene (100) stearyl ether (trade name: Brij S100; manufactured by Sigma-Aldrich) which was a non-ionic surfactant in water was prepared.

A single-walled carbon nanotube mixture having an average diameter of 1 nm was weighted so that the amount of the single-walled carbon nanotube mixture in a dispersion liquid was 0.3 μg/mL. Unlike Working Example 1, the weighted single-walled carbon nanotube mixture is not subjected to vacuum annealing treatment.

Subsequently, as in Working Example 1, the dispersion liquid of the single-walled carbon nanotube mixture (a Pristine dispersion liquid) was obtained by dispersing the single-walled carbon nanotube mixture in the solution B.

In a part of the obtained dispersion liquid of the single-walled carbon nanotube mixture, the amount of the non-ionic surfactant was reduced to 1/10 by removing the non-ionic surfactant contained in the dispersion liquid of the single-walled carbon nanotube mixture using a dialysis method or the like.

"Evaluation of Average Zeta Potential of Dispersion Liquid of Single-Walled Carbon Nanotube Mixture"

An average zeta potential of the dispersion liquid in the single-walled carbon nanotube mixture was measured in the same manner as in Working Example 1. FIG. 2 shows the results.

As a result of the measurement, it was confirmed that the average zeta potential of the dispersion liquid in the single-walled carbon nanotube mixture was around −16.5 mV.

"Operation of Separating Dispersion Liquid in Single-Walled Carbon Nanotube Mixture"

The dispersion liquid or the like in the single-walled carbon nanotube mixture was injected into a separation layer and a separation operation was performed in the same manner as in Working Example 1.

"Spectroscopic Analysis of Dispersion Liquid in Single-Walled Carbon Nanotube Mixture"

Each 7 mL of a dispersion liquid in a single-walled carbon nanotube mixture after 72 hours was fractionated and the dispersion liquid in the single-walled carbon nanotube mixture after the separation operation was collected from an F1 layer in the lowermost portion to an F11 layer which was an eleventh layer from the bottom thereof. Optical absorption spectra of the dispersion liquid of the single-walled carbon nanotubes after the separation operation and the Pristine dispersion liquid before the separation operation were measured using a spectrophotometer (trade name: a UV-visible near-infrared spectrophotometer UV-3600; manufactured by Shimadzu Corporation).

Figure 6:
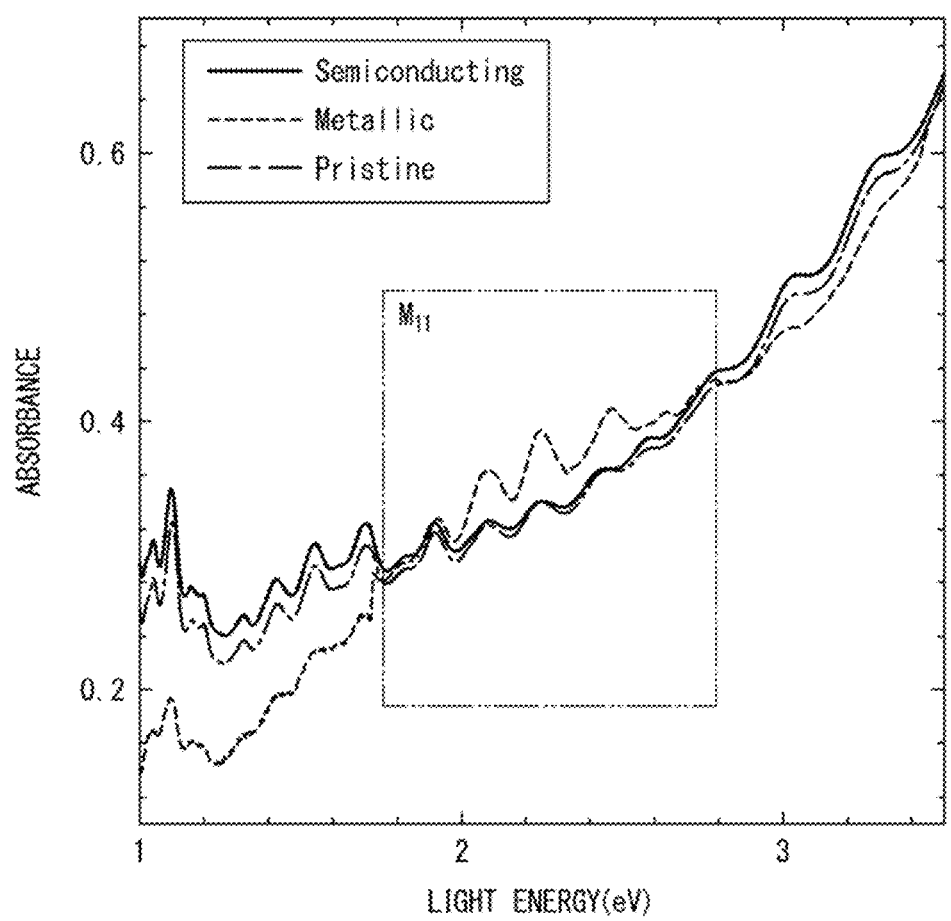
FIG. 6 is a diagram showing the results of optical absorption analysis in Comparative Example 1.

FIG. 6 shows the results.

It was confirmed from the results of the optical absorption spectra shown in FIG. 6 that there was almost no difference between the absorbance of the Pristine dispersion liquid in the single-walled carbon nanotube mixture before the separation operation and the absorbance of the (semiconducting) dispersion liquid of the single-walled carbon nanotubes in the F1 layer after the separation operation in a peak range derived from a metal (within a rectangular range of M11). In this way, it was found that the dispersion liquid in the single-walled carbon nanotube mixture having the average zeta potential around −16.5 mV could not be separated.

Comparing the experimental results of Working Example 1 and Comparative Example 1, when the single-walled carbon nanotube mixture was subjected to vacuum annealing treatment, subsequent separation operations were possible and high purity semiconducting single-walled carbon nanotubes and metallic single-walled carbon nanotubes were obtained. Physical property quantities which have changed significantly in the above-described vacuum annealing treatment include the average zeta potential. Therefore, in the method for separating a single-walled carbon nanotube mixture of the present invention, it was clear that it was extremely important to make the physical property quantities of the dispersion liquid in the single-walled carbon nanotube mixture, particularly, the average zeta potential have a prescribed value. Furthermore, it was found that vacuum annealing treatment was effective for making the average zeta potential have a prescribed value.

Working Example 2

"Operation of Preparing Dispersion Liquid in Single-Walled Carbon Nanotube Mixture"

Solution B obtained by dissolving 1.0 wt % of polyoxyethylene (100) stearyl ether (trade name: Brij S100; manufactured by Sigma-Aldrich) which was a non-ionic surfactant in water was prepared.

A single-walled carbon nanotube mixture having an average diameter of 1 nm synthesized using an eDIPS method was weighted so that the amount of a dispersion liquid in a single-walled carbon nanotube mixture was 0.3 μg/mL.

Unlike Working Example 1, the weighted single-walled carbon nanotube mixture is not subjected to vacuum annealing treatment.

Subsequently, the dispersion liquid in the single-walled carbon nanotube mixture was obtained by dispersing the single-walled carbon nanotube mixture into the solution B in the same manner as in Working Example 1.

In a part of the obtained dispersion liquid in the single-walled carbon nanotube mixture, the amount of the non-ionic surfactant was reduced to $1/10$ by removing the non-ionic surfactant contained in the dispersion liquid in the single-walled carbon nanotube mixture, for example, a dialysis method or the like.

"Evaluation of Average Zeta Potential of Dispersion Liquid in Single-Walled Carbon Nanotube Mixture"

An average zeta potential of the dispersion liquid in the single-walled carbon nanotube mixture obtained by reducing the amount of the non-ionic surfactant to $1/10$ was measured in the same manner as in Working Example 1. FIG. 2 shows the results.

As a result of the measurement, it was confirmed that the average zeta potential of the dispersion liquid in the single-walled carbon nanotube mixture was around −11.8 mV.

"Operation of Separating Dispersion Liquid in Single-Walled Carbon Nanotube Mixture"

The dispersion liquid or the like in the single-walled carbon nanotube mixture was injected into a separation tank and a separation operation was performed in the same manner as in Working Example 1.

Figure 7:
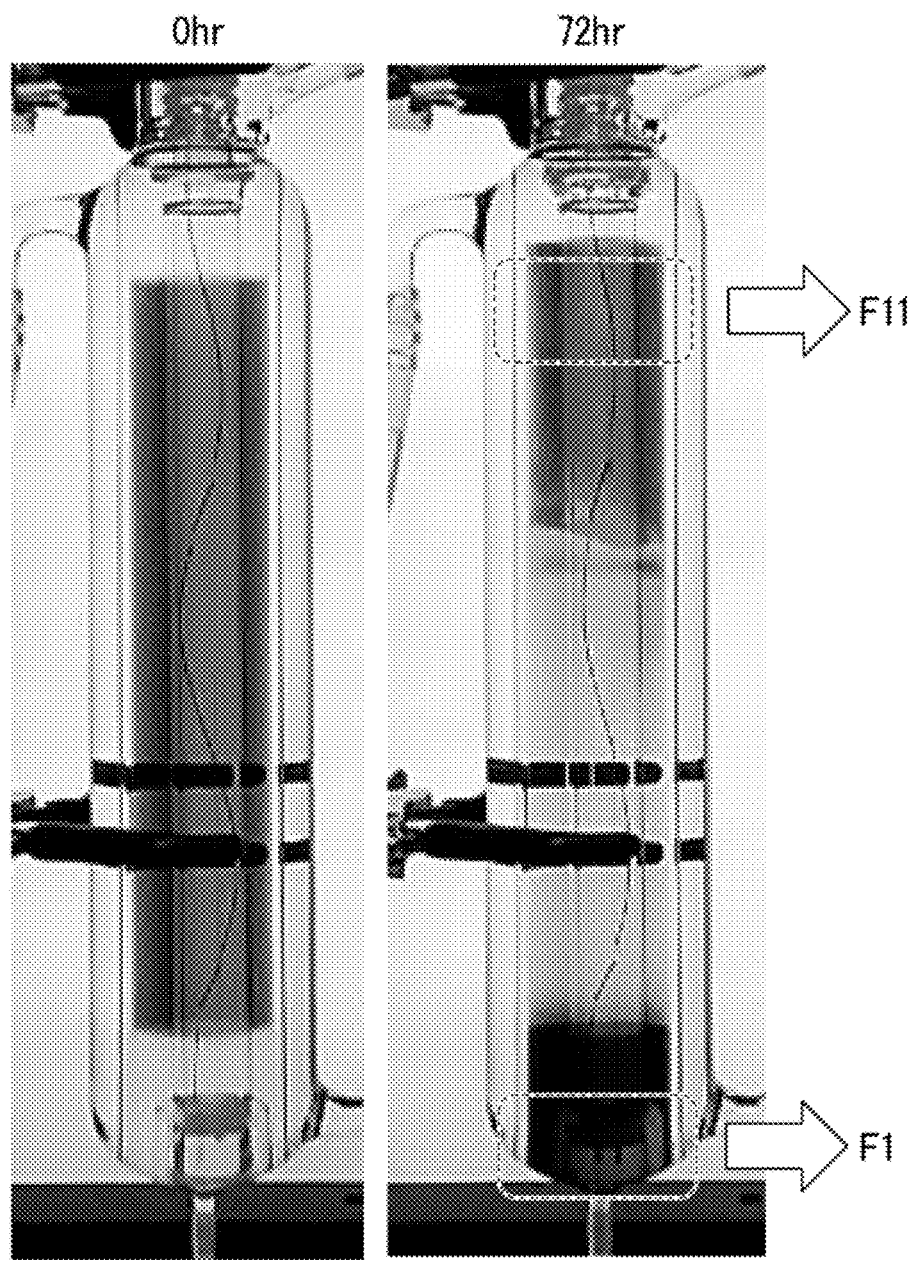
FIG. 7 is a photograph showing a layer formation state when separation ends in Working Example 2.

FIG. 7 shows optical photographs showing states of a dispersion liquid in a single-walled carbon nanotube mixture inside the separation tank before voltage application (0 hrs) and 72 hours after voltage application (72 hrs). Comparing the photograph before voltage application with the photograph 72 hours after voltage application, it was found that the solution inside the separation tank was separated into three layers 72 hours later.

"Spectroscopic Analysis of Dispersion Liquid in Single-Walled Carbon Nanotube Mixture"

Each 7 mL of a dispersion liquid in a single-walled carbon nanotube mixture after 72 hours was fractionated and the dispersion liquids of the single-walled carbon nanotubes from a F1 layer (FIG. 7) in the lowermost portion and a F11 layer which was an eleventh layer from the bottom were collected. Spectroscopic analysis was performed on the dispersion liquid of the single-walled carbon nanotubes after separation operation and the Pristine dispersion liquid before the separation operation.

Figure 8:
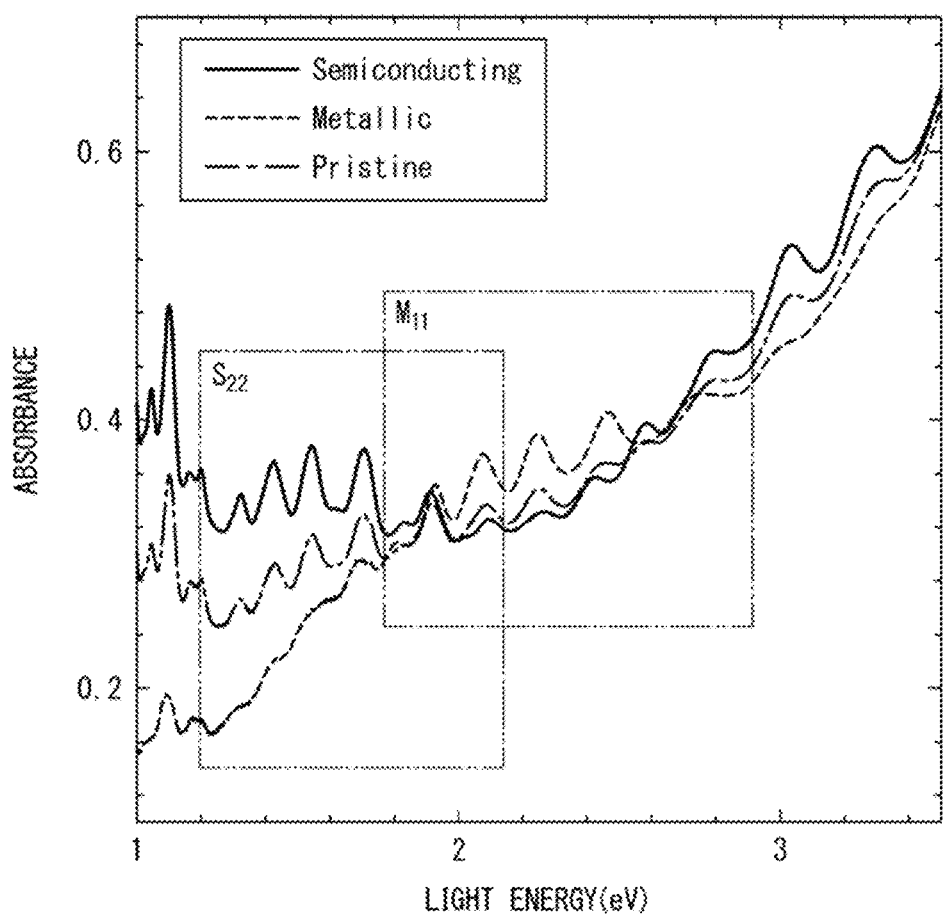
FIG. 8 is a diagram showing the results of optical absorption analysis in Working Example 2.
Figure 9:
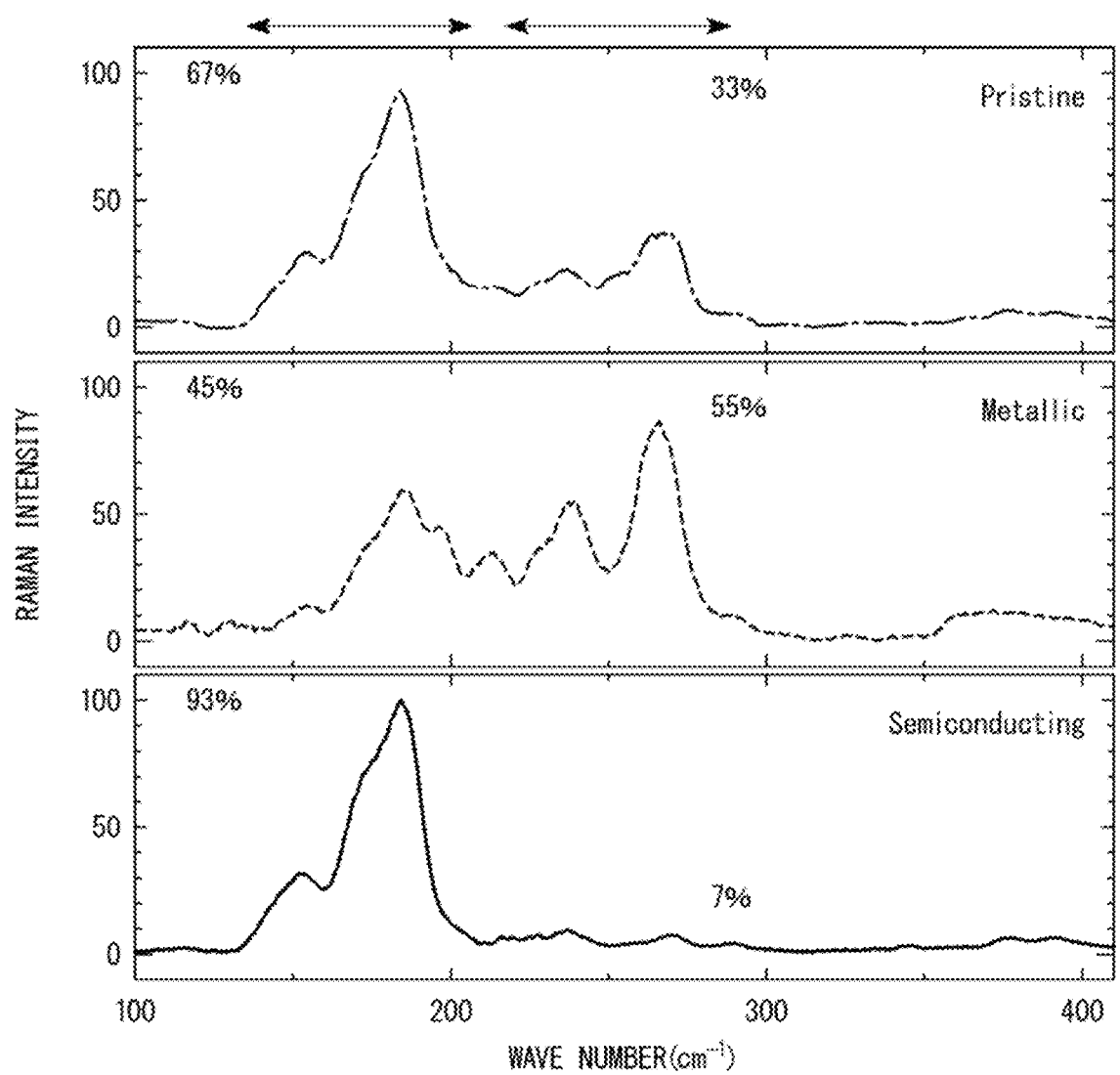
FIG. 9 is a diagram showing the results of Raman spectroscopic analysis in Comparative Example 1.

As the spectroscopic analysis, optical absorption analysis and Raman spectroscopic analysis were performed. FIGS. 8 and 9 show the results.

It was confirmed from the results of the optical absorption analysis shown in FIG. 8 that in a peak range derived from a metal (within a rectangular range of M11), compared with the Pristine dispersion liquid in the single-walled carbon nanotube mixture before the separation operation, a decrease in absorbance observed in the (semiconducting) dispersion liquid of the single-walled carbon nanotubes in the F1 layer after the separation was shown and an increase in absorbance was clearly shown in the (metallic) dispersion liquid of the single-walled carbon nanotubes in the F11 layer after the separation.

FIG. 9 is a diagram showing the results of the Raman spectroscopic analysis through excitation of a laser with a wavelength of 532 nm and a spectrum in a range of a wave number of 100 $cm^{-1}$ to 400 $cm^{-1}$ called a radial breathing mode (RBM). In the spectrum shown in FIG. 4, a peak in a range of a wave number of 150 cm$^{-1}$ to 200 cm$^{-1}$ is derived from semiconducting single-walled carbon nanotubes and a peak in a range of a wave number of 200 cm$^{-1}$ to 300 cm$^{-1}$ is derived from metallic single-walled carbon nanotubes.

From the results of the Raman spectroscopic analysis shown in FIG. 9, assuming that a content ratio of semiconducting single-walled carbon nanotubes of a Pristine dispersion liquid in the single-walled carbon nanotube mixture before the separation operation was 67%, when a content ratio of semiconducting single-walled carbon nanotubes and metallic single-walled carbon nanotubes in the single-walled carbon nanotube dispersion liquid after the separation was obtained, it was found that 93% or more of semiconducting single-walled carbon nanotubes were contained in the (semiconducting) single-walled carbon nanotube dispersion liquid in the F1 layer after the separation and 55% of metallic single-walled carbon nanotubes were contained in the (metallic) single-walled carbon nanotube dispersion liquid in the F11 layer after the separation.

Comparing the experimental results of Working Example 1 and Working Example 2, in order to obtain high purity semiconducting single-walled carbon nanotubes and metallic single-walled carbon nanotubes, it was essentially confirmed that it was extremely important to make the physical property quantities of the dispersion liquid in the single-walled carbon nanotube mixture, particularly, the average zeta potential have a prescribed value. Even if vacuum annealing treatment is not performed, when the average zeta potential is a prescribed value, subsequent separation operations are possible and high purity semiconducting single-walled carbon nanotubes and metallic single-walled carbon nanotubes are obtained. On the other hand, a treatment such as vacuum annealing treatment is effective when the average zeta potential is made to have a prescribed value, regardless of an initial state of the single-walled carbon nanotube mixture.

INDUSTRIAL APPLICABILITY

According to the present invention, it is possible to identify a single-walled carbon nanotube mixture in which high purity separation is difficult before a separation operation. The used of a single-walled carbon nanotube mixture dispersion liquid to be used which can be screened before the separation operation increases the yield and work efficiency of subsequent separation operations. As a result, it is possible to provide single-walled carbon nanotubes of which purity has been increased through the separation operation at low cost.

Also, according to the present invention, it is possible to separate the single-walled carbon nanotube mixture with high purity, regardless of an initial state of the single-walled carbon nanotube mixture. If a single-walled carbon nanotube mixture which has not been conventionally separated and thus cannot be used industrially is subjected to an appropriate cleaning treatment so that physical property quantities fall within a desired range, it is possible to perform separation and purification with high purity. As a result, it is possible to provide single-walled carbon nanotubes separated and purified with high purity through the separation operation at low cost.

As described above, according to the present invention, it is possible to stably separate and purify a single-walled carbon nanotube mixture with high purity and the industrial significance is extremely large.

A part or all of the above example embodiments can be described as the following supplementary notes, but is not limited to the following description.

(Supplementary Note 1) A method for separating a single-walled carbon nanotube mixture includes: a step of preparing a dispersion liquid containing the single-walled carbon nanotube mixture and a surfactant; and a step of separating the single-walled carbon nanotube mixture contained in the dispersion liquid, wherein in the step of separating the single-walled carbon nanotube mixture, a dispersion liquid in which a physical property quantity of the dispersion liquid is within a prescribed range is used.

(Supplementary Note 2) The method for separating a single-walled carbon nanotube mixture according to Supplementary Note 1, wherein the physical property quantity of the dispersion liquid is an average zeta potential.

(Supplementary Note 3) The method for separating a single-walled carbon nanotube mixture according to Supplementary Note 2, wherein the average zeta potential is adjusted to −15 mV or higher.

(Supplementary Note 4) The method for separating a single-walled carbon nanotube mixture according to Supplementary Note 2 or 3, wherein the average zeta potential is adjusted to 0 mV or lower.

(Supplementary Note 5) The method for separating a single-walled carbon nanotube mixture according to Supplementary Note 1, wherein the physical property quantity is a pH of the dispersion liquid.

(Supplementary Note 6) The method for separating a single-walled carbon nanotube mixture according to Supplementary Note 1, wherein the physical property quantity is a conductivity of the dispersion liquid.

(Supplementary Note 7) The method for separating a single-walled carbon nanotube mixture according to any one of Supplementary Notes 1 to 6, wherein in the step of preparing the dispersion liquid containing the single-walled carbon nanotube mixture and the surfactant, a process of cleaning the single-walled carbon nanotube mixture is performed to adjust the physical property quantity within a prescribed range.

(Supplementary Note 8) The method for separating a single-walled carbon nanotube mixture according to Supplementary Note 7, wherein the process of cleaning the single-walled carbon nanotube mixture is a process of removing electric charges of the single-walled carbon nanotube mixture.

(Supplementary Note 9) The method for separating a single-walled carbon nanotube mixture according to Supplementary Note 7, wherein the process of cleaning the single-walled carbon nanotube mixture includes a step of annealing the single-walled carbon nanotube mixture.

(Supplementary Note 10) The method for separating a single-walled carbon nanotube mixture according to any one of Supplementary Notes 1 to 9, wherein in the step of preparing of the dispersion liquid, a polyoxyethylene alkyl ether represented by the following Expression (1) is used as the surfactant:

$$C_nH_{2n}(OCH_2CH_2)_mOH \qquad (1)$$

(where, n=12 to 18 and m=20 to 100).

(Supplementary Note 11) The method for separating a single-walled carbon nanotube mixture according to any one of Supplementary Notes 1 to 9, wherein in the step of separating the single-walled carbon nanotube mixture, the single-walled carbon nanotube mixture is separated into the metallic single-walled carbon nanotubes and the semiconducting single-walled carbon nanotubes by applying a direct current voltage to the dispersion liquid, moving the metallic single-walled carbon nanotubes contained in the dispersion liquid toward a cathode side, and moving the semiconducting single-walled carbon nanotubes contained in the dispersion liquid toward an anode side.

(Supplementary Note 12) A single-walled carbon nanotube dispersion liquid includes: a single-walled carbon nanotube mixture; and a surfactant, wherein the single-walled carbon nanotube dispersion liquid has an average zeta potential of −15 mV or higher and 0 mV or lower.

The invention claimed is:

1. A method for separating a single-walled carbon nanotube mixture, the method comprising:
subjecting a single-walled carbon nanotube mixture that includes metallic single-walled carbon nanotubes and semiconducting single-walled carbon nanotubes to a cleaning treatment, the cleaning treatment including annealing the single-walled carbon nanotubes in a vacuum to remove functional groups present on the surfaces of the metallic and semiconducting single-walled carbon nanotubes,
preparing a dispersion liquid by dispersing the single-walled carbon nanotube mixture that was subjected to the cleaning treatment in a solution containing a surfactant and a dispersion medium, the obtained dispersion liquid having an average zeta potential of −15 mV or higher and a pH of from 6.0 to 7.5; and
separating the metallic single-walled carbon nanotubes from the semiconducting single-walled carbon nanotubes contained in the dispersion liquid by applying a direct current voltage in a vertical direction to the dispersion liquid,
wherein the cleaning treatment of the single-walled carbon nanotube mixture is configured to adjust the average zeta potential of the dispersion to −15 mV or higher and to adjust the pH of the dispersion to from 6.0 to 7.5.

2. The method for separating a single-walled carbon nanotube mixture according to claim 1, wherein the average zeta potential of the dispersion liquid is adjusted to be 0 mV or lower.

3. The method for separating a single-walled carbon nanotube mixture according to claim 1, wherein the process of cleaning the single-walled carbon nanotube mixture includes removing electric charges of the metallic and semiconducting single-walled carbon nanotubes.

4. The method for separating a single-walled carbon nanotube mixture according to claim 1, wherein in the step of preparing of the dispersion liquid, a polyoxyethylene alkyl ether represented by the following expression is used as the surfactant:

$$C_nH_{2n}(OCH_2CH_2)_mOH$$

where, n=12 to 18 and m=20 to 100.

5. The method for separating a single-walled carbon nanotube mixture according to claim 1, wherein in the separating the single-walled carbon nanotube mixture, the metallic single-walled carbon nanotubes contained in the dispersion liquid are moved toward a cathode side and the semiconducting single-walled carbon nanotubes contained in the dispersion liquid are moved toward an anode side by the application of the direct current voltage to the dispersion liquid.

6. A single-walled carbon nanotube dispersion liquid comprising:
a single-walled carbon nanotube mixture comprising metallic single-walled carbon nanotubes and semiconducting single-walled carbon nanotubes; and
a surfactant,
wherein the single-walled carbon nanotube mixture is subject to a cleaning treatment, the cleaning treatment including annealing the single-walled carbon nanotubes in a vacuum to remove functional groups present on the surfaces of the metallic and the semiconducting single-walled carbon nanotubes;
the dispersion liquid is prepared by dispersing the single-walled carbon nanotube mixture that was subjected to the cleaning treatment in a solution containing a surfactant and a dispersion medium, the obtained dispersion liquid having an average zeta potential of
−15 mV or higher and a pH of from 6.0 to 7.5;
the metallic single-walled carbon nanotubes are separated from the semiconducting single-walled carbon nanotubes contained in the dispersion liquid by applying a direct current voltage in a vertical direction to the dispersion liquid; and
the cleaning treatment of the single-walled carbon nanotube mixture is configured to adjust the average zeta potential of the dispersion to −15 mV or higher and to adjust the pH of the dispersion to from 6.0 to 7.5.

7. The single-walled carbon nanotube dispersion liquid according to claim 6, wherein the average zeta potential is −10.2 mV or higher and 0 mV or lower.

8. The method for separating a single-walled carbon nanotube mixture according to claim 1, wherein the pH is adjusted to be from 6.5 to 7.2.

9. The single-walled carbon nanotube dispersion liquid according to claim 6, wherein the pH is adjusted to be from 6.5 to 7.2.

10. The method for separating a single-walled carbon nanotube mixture according to claim 1, wherein the surfactant includes at least one of polyoxyethylene lauryl ether, polyoxyethylene cetyl ether, polyoxyethylene stearyl ether, or polyoxyethylene oleyl ether.

11. The single-walled carbon nanotube dispersion liquid according to claim 6, wherein the surfactant includes at least one of polyoxyethylene lauryl ether, polyoxyethylene cetyl ether, polyoxyethylene stearyl ether, or polyoxyethylene oleyl ether.

12. The method for separating a single-walled carbon nanotube mixture according to claim 1, the dispersion liquid consists of the single-walled carbon nanotube, the surfactant, and dispersion medium.

13. The single-walled carbon nanotube dispersion liquid according to claim 6, the dispersion liquid consists of the single-walled carbon nanotube, the surfactant, and dispersion medium.

14. The method for separating a single-walled carbon nanotube mixture according to claim 12, the dispersion medium is water or heavy water.

15. The single-walled carbon nanotube dispersion liquid according to claim 13, the dispersion medium is water or heavy water.

16. The method for separating a single-walled carbon nanotube mixture according to claim 1, wherein the preparing the dispersion further comprises subjecting the single-walled carbon nanotube mixture to ultrasonic treatment to disperse the single-walled carbon nanotubes.

17. The method for separating a single-walled carbon nanotube mixture according to claim 16, wherein the preparing the dispersion further comprises, after the ultrasonic treatment, subjecting the single-walled carbon nanotube mixture to ultracentrifugation.

18. The method for separating a single-walled carbon nanotube mixture according to claim 1, wherein, prior to the preparing the dispersion liquid, the single-walled carbon nanotubes of the single-walled carbon nanotube mixture are subjected to an acid treatment for removing catalytic metals, wherein the acid treatment creates the functional groups present on the surfaces of the single-walled carbon nanotubes, and wherein the functional groups comprise carboxyl groups and carbonyl groups.

19. The method for separating a single-walled carbon nanotube mixture according to claim 1, wherein the average zeta potential of the dispersion is −13 mV to −7 mV.

20. The method for separating a single-walled carbon nanotube mixture according to claim 1, wherein the separating the single-walled carbon nanotube mixture contained in the dispersion liquid is performed in a separation tank, wherein, in the separating the single-walled carbon nanotube mixture, the single-walled carbon nanotube mixture is separated into metallic single-walled carbon nanotubes and semiconducting single-walled carbon nanotubes within the separation tank by applying the direct current voltage to the dispersion liquid in the vertical direction, wherein the separation tank includes a cathode disposed at an upper end of the separation tank in the vertical direction and an anode disposed at a lower end of the separation tank in the vertical direction.

21. The method for separating a single-walled carbon nanotube mixture according to claim 20, wherein the direct current voltage is applied for 1 to 72 hours.

22. The method for separating a single-walled carbon nanotube mixture according to claim 21, wherein the direct current voltage is applied between the cathode and the anode at an electric field strength of 0.5 V/Cm to 15 V/cm.

* * * * *